United States Patent
Kumar et al.

(10) Patent No.: US 7,685,563 B2
(45) Date of Patent: Mar. 23, 2010

(54) REUSABLE CUSTOMIZED PROJECT SYSTEM

(75) Inventors: Rahul Kumar, Kirkland, WA (US); Joshua Shepard, Seattle, WA (US); Kevin Perry, Redmond, WA (US); Diane Melde, Poulsbo, WA (US); Izydor Gryko, Sammamish, WA (US); C. Douglas Hodges, Sammamish, WA (US); Jemy Huang, Redmond, WA (US); Christopher Joseph Burrows, Seattle, WA (US); Svetlozar Keremidarski, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 936 days.

(21) Appl. No.: 10/790,663

(22) Filed: Mar. 1, 2004

(65) Prior Publication Data

US 2005/0193383 A1 Sep. 1, 2005

(51) Int. Cl.
*G06F 9/44* (2006.01)
(52) U.S. Cl. .................. 717/107; 717/108; 717/116; 717/120; 717/121
(58) Field of Classification Search .............. 123/41.54; 165/51
See application file for complete search history.

(56) References Cited

U.S. PATENT DOCUMENTS

| | | | | |
|---|---|---|---|---|
| 5,710,925 A | * | 1/1998 | Leach et al. | ................. 719/316 |
| 5,805,885 A | * | 9/1998 | Leach et al. | ................. 719/316 |
| 6,256,780 B1 | * | 7/2001 | Williams et al. | ............. 717/107 |
| 6,412,020 B1 | * | 6/2002 | Leach et al. | ................. 719/316 |
| 6,754,885 B1 | * | 6/2004 | Dardinski et al. | ........... 717/113 |
| 2005/0177818 A1 | * | 8/2005 | Huene et al. | ................. 717/116 |
| 2006/0095441 A1 | * | 5/2006 | Perry et al. | .................. 707/100 |

OTHER PUBLICATIONS

Atul Gupta, "Building a Custom Project Wizard in Visual Studio .NET", May 2003, Infosys Technologies Limited, pp. 1-10.*
"What's new in visual studio.NET 2002," downloaded from the Internet on Feb. 22, 2006, http://msdn.microsoft.com/library/default.asp?url=/library/en-us/vsintro7/html/vxriWhatsNewInVisualStudioNET2002.asp , including Application Template section, 6 pages.
"Features overview for visual C# .NET 202," downloaded from the Internet on Feb. 22, 2006, http://msdn.microsoft.com/vcsharp/previous/2002/features/default.aspx, 2 pages.

* cited by examiner

*Primary Examiner*—Michael J Yigdall
*Assistant Examiner*—Ben C Wang
(74) *Attorney, Agent, or Firm*—Woodcock Washburn LLP

(57) ABSTRACT

An extensible project system for software development is provided by allowing a flavor, with a specific purpose, to be applied to a base project system. More than one flavor may be applied. Where components are distributed objects, such as where COM (component object model) is used, the project system is assembled by aggregation of a base project object, which contains some data for creating a project system with a flavor object, which modifies the project system. The base project object is the participating object in the aggregation and the flavor object is the controlling object. Multiple flavors may be applied to create a project system intended for multiple purposes, corresponding to the applied flavors.

18 Claims, 5 Drawing Sheets

REUSABLE CUSTOMIZED PROJECT SYSTEM

FIELD OF THE INVENTION

This invention relates in general to the field of project development systems. More particularly, this invention relates to project development systems which can be reused in several environments and easily customized for such reuse.

BACKGROUND OF THE INVENTION

To develop a software project, the developer(s) may use several development tools. Some tools may be used to assist in writing code for the software project. Tools for building the code, running the code, and debugging the code may also be useful. These tools may be separate or they may be packaged together into an integrated development environment (IDE). Additional tools included in an IDE may include file and library management, among others. An integral part of an IDE is a project system, which is used to tie the tools together.

While a software project is being developed, certain parameters must be known regarding the use of the resulting software project in order for the project system to provide the correct tools and properties. For example, consider the case in which a software project is developed for use with a particular target architecture or platform. The target architecture or platform which the software project is intended to be used with affects many facets of the software project. For example, one architecture currently in use is a 64-bit® architecture known as IA-64®. If the project is being developed for use on an IA-64 platform, there may be a specific IA-64® programming stylesheet which should be followed for the project. This stylesheet should be accessible to the project system so the project system can guide the developer in developing code according to the stylesheet's dictates. Additionally, the developer can use certain tools or toolsets specific to the IA-64®(or to a set of platforms including the IA-64®). For example, the debugger used to debug the project while in development will be specific to the IA-64®. Additionally, tools for running the code in the IA-64 environment may be required by the developer.

Once a project has been developed, if the developer wants to develop a similar project for use on a different architecture, a different project system must be created for developing software for that new architecture, one which includes the correct resources for the architecture, such as stylesheets and debuggers. Development must then occur using the new project system in order to accommodate the change in architecture.

Generally, this reduplication of effort in creation of a new project system occurs whenever a software project is required for a new purpose, even if there had been a previous similar project. One example of a new purpose, as described above, may the use of a different architecture. Other different purposes which may be required include different platforms, components, assemblies, or uses (e.g. use as a web service). The reduplication of effort needed to develop a software package for the new purpose entails a substantial cost of time and other resources.

One way to reduce reduplication of effort is to use templates, for example, enterprise templates as used in MICROSOFT VISUAL STUDIO.NET®. Software architects frequently evaluate new technologies, explore possible ways to use them, and recommend best practices. Through the use of enterprise templates, software architects can provide guidance to development teams about how to work within an architecture by eliminating many decisions involving component and item choices that should not be part of the developer's burden. Enterprise templates simplifies these choices by dynamically modifying certain integrated development environment (IDE) features in VISUAL STUDIO NET®. Enterprise templates can provide certain beginning project structures and continuous development guidance as components are added, properties exposed, and values assigned.

However, these enterprise templates are limited in their application because of their implementation. First, only one template can be applied at a time. Second, the templates have only limited utility. A template can modify or limit the use of existing functionality in the project system, but it can not add new functionality to the project system. For example, a template can disable or enable toolbox items or menu items which are provided in the project system. A template can also assign a value to a property which can be used in the project system. For example, the background color of a form can be assigned using a template. A template can limit the range of allowed values for a property, such as timeout values. However, no additional functionality can be supplied by use of a template. An additional limitation is that design-time properties (such as Locked or Modifiers in VISUAL STUDIO .NET) can not be controlled through a template.

In view of the foregoing there is a need for a system that overcomes the drawbacks of the prior art.

SUMMARY OF THE INVENTION

A "flavor" may be applied to a software development system. Each "flavor" of project corresponds to a different purpose. A project flavor provides the ability to customize parts of the project system given a priori knowledge that output (the project) will be used in a particular way.

More than one flavor may be applied. For example, one project flavor for a base project system might deal with the target database which the project being developed will run on. As another example, another project flavor may not be specific to a target database, but may provide extensions to the project system that are particularly useful in database development. A policy may influence the development of the project, and there may be a project flavor for the policy. By applying the flavor for the correct target database and the flavor for the project policy, a project system can be customized for the purpose of the project. When the project system needs to be reused with a different purpose, new flavors may be applied to the base project system. Thus, flexibility in creating new project systems from a base project system is achieved.

Other features of the invention are described below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings example constructions of the invention; however, the invention is not limited to the specific methods and instrumentalities disclosed. In the drawings.

DETAILED DESCRIPTION OF ILLUSTRATIVE EMBODIMENTS

Overview

In order to provide platform extensibility for project systems, component object model (COM)-type aggregation may be used. A base project object includes interfaces for the project system. These interfaces may be overridden or enhanced by including the same interface on a flavor object. The flavor object is aggregated with the base project object, with the flavor object as a wrapper. In addition to COM-type aggregation to override or enhance interfaces, a property of the project system is made modifiable by a flavor by inclusion in an interface to the base project object. The flavor object can then change the property by changing the interface, thereby modifying the property. In addition, delegation is used to allow the extension of additional project objects such as project configuration objects and property browser objects. Additional detail is provided below.

Exemplary Computing Environment

Figure 1:
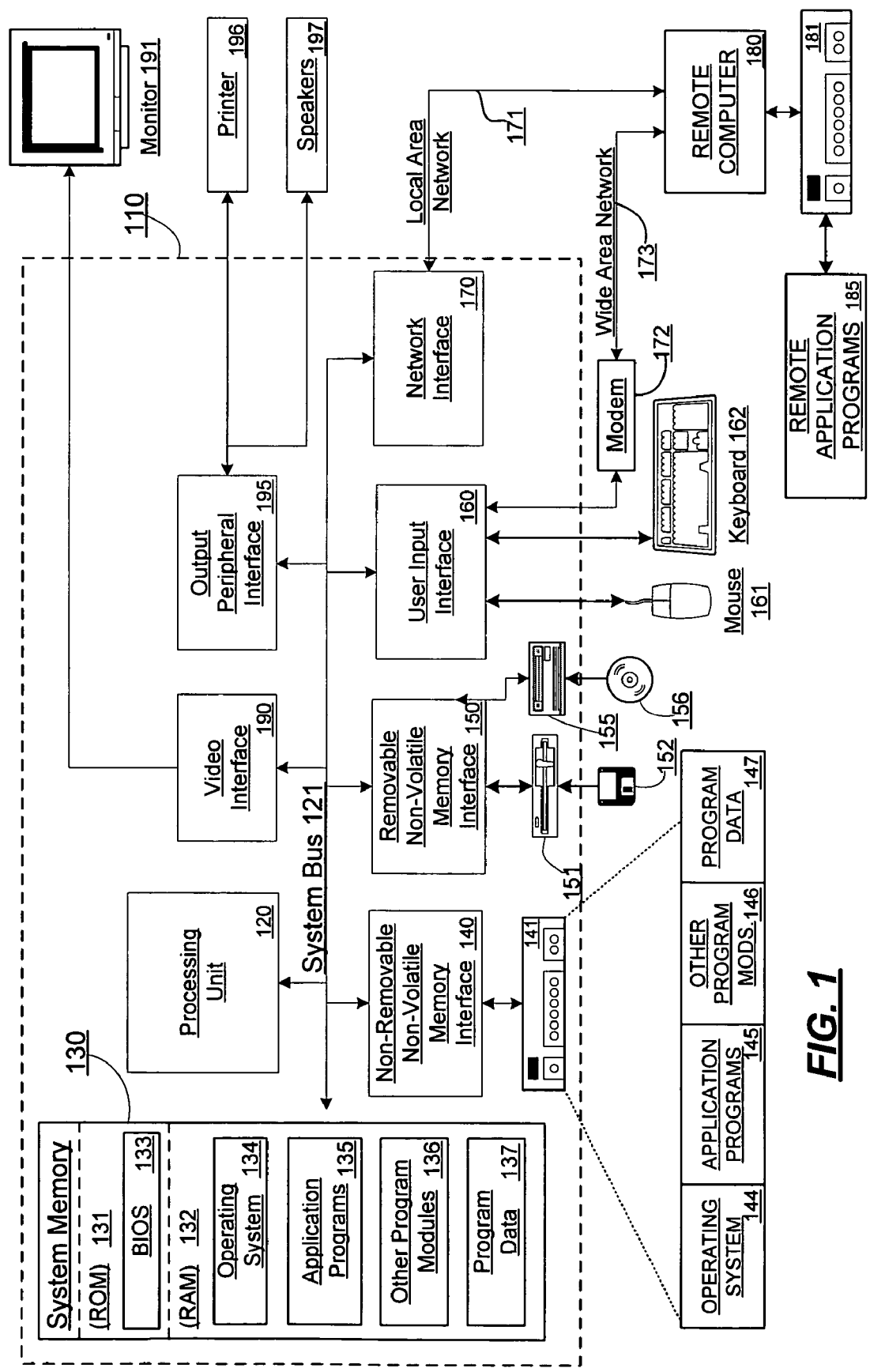
FIG. 1 is a block diagram of an example computing environment in which aspects of the invention may be implemented.

FIG. 1 shows an exemplary computing environment in which aspects of the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The processing unit 120 may represent multiple logical processing units such as those supported on a multi-threaded processor. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). The system bus 121 may also be implemented as a point-to-point connection, switching fabric, or the like, among the communicating devices.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Reusable Customized Project System
  COM Aggregation
  In order to customize a project system based on prior knowledge that the output will be used for a particular purpose, according to one embodiment, component object aggregation is used. Object models, such as Microsoft Corporation's Component Object Model ("COM"), facilitate the implementation of complex systems by allowing the use of objects as reusable components. COM is more fully described in "Inside COM" by Dale Rogerson and published by Microsoft Press in 1997. COM specifies that each object is to implement a certain interface referred to as the IUnknown interface. The IUnknown interface in COM provides a query interface function, an add reference function, and a release function. The query interface function is passed the identifier of an interface and returns a reference to that interface. The add reference and the release functions are used for reference counting the object. Each object that conforms to COM implements the IUnknown interface. While the invention will be described with reference to COM, it is contemplated that any object technology can be used.

COM aggregation occurs with cooperation between two or more COM objects. One COM object is the controlling object. The other COM objects are participating objects. The controlling object and the participating objects work together. The controlling object can replace or enhance interfaces of the participating objects. The controlling object passes selected interfaces from the participating objects to the client. Thus, when a call is made which requires an interface provided by a participating object, the client can use the interface from the participating objects. This is contrasted with COM containment, in which the call would be handled by the controlling object and passed to the participating object, resulting in a slight performance loss and other consequences. While there are several objects being used in the aggregation, the client sees the aggregation as one unit.

Figure 2:
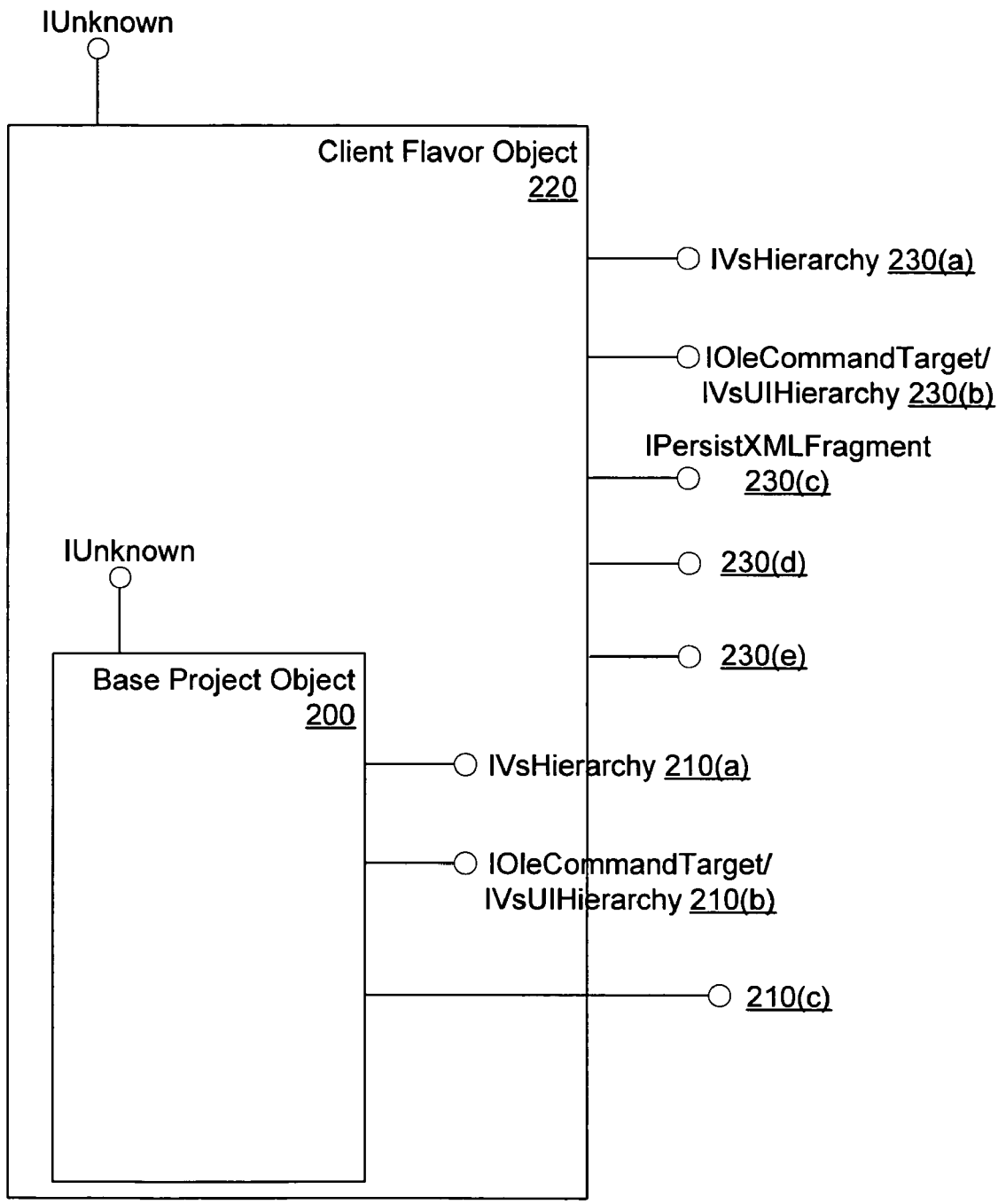
FIG. 2 is a block diagram of a flavor applied to a project system according to one embodiment of the invention.

In one embodiment, a flavor is implemented in a COM object, as is the base project. The base project COM object contains basic project system information. The flavor COM object implements interfaces (application programming interfaces, or APIs). One or more interfaces in the flavor COM object may be duplicative of an interface provided by the base project COM object. In such cases, COM aggregation will determine which implementation of the interface will be used, generally allowing the flavor object to override the base project object. FIG. 2 is a block diagram of a flavor applied to a project system according to one embodiment of the invention. As an example of the use of COM aggregation to determine which implementation of an interface will be used, as shown in FIG. 2, base project object 200 implements the IUnknown interface. Base project object 200 provides a project system by implementing a number of other interfaces IVsHierarchy interface 210(*a*), IOleCommandTarget/IVsUIHierarchy interface 210(*b*), and a third interface 210(*c*).

When a method of the IVsHierarchy interface is called by an action of a developer using the base project object 200, in the absence of an added flavor, the interface used would be IVsHierarchy interface 210(*a*). However, client flavor object 220 is being used with the base project object 200. Client flavor 220 is also a COM object, and the client flavor object 220 and the base project object 200 have been aggregated in such a way so as to allow the client flavor object 220 to override or enhance the capabilities of the base project object 200. For example, as shown in FIG. 2, client flavor object 220 implements its own IVsHierarchy interface, IVsHierarchy 230(*a*). When an IVsHierarchy interface is needed in the IDE where the client flavor object 220 has been applied to base project object 200 as shown in FIG. 2, the IVsHierarchy interface 230(*a*) will be called first. The same is true for IOleCommandTarget/IVsUIHierarc- hy interface 230(*b*) which will be provided to the client rather than IOleCommandTarget/IVsUIHierarchy interface 210(b). Thus, a flavor object can override a base project object. If only part of the interface is implemented in the flavor, the call to the interface can be passed in to the base project object 220. In this way, the flavor can enhance an interface implemented in the base project object 200 without needing to re-implement the entire interface.

Third interface 210(c) provided by base project object 200 is not also provided by client flavor 220. Because of COM aggregation, this interface is provided by client flavor object 220 to the client. Thus, client flavor object 220 provides a way for the client to directly access some functionality of the base project object 200 (by providing the interface 210(c), enhances or overrides some of the base project object 200 functionality (by providing IVsHierarchy interface 230(a), and IOleCommandTarget/IVsUIHierarchy interface 230(b)), and adds to the functionality of the base project object 200 by providing interfaces such as IPersistXMLFragment 230(c) and interfaces 230(d) and 230(e).

Figure 3:
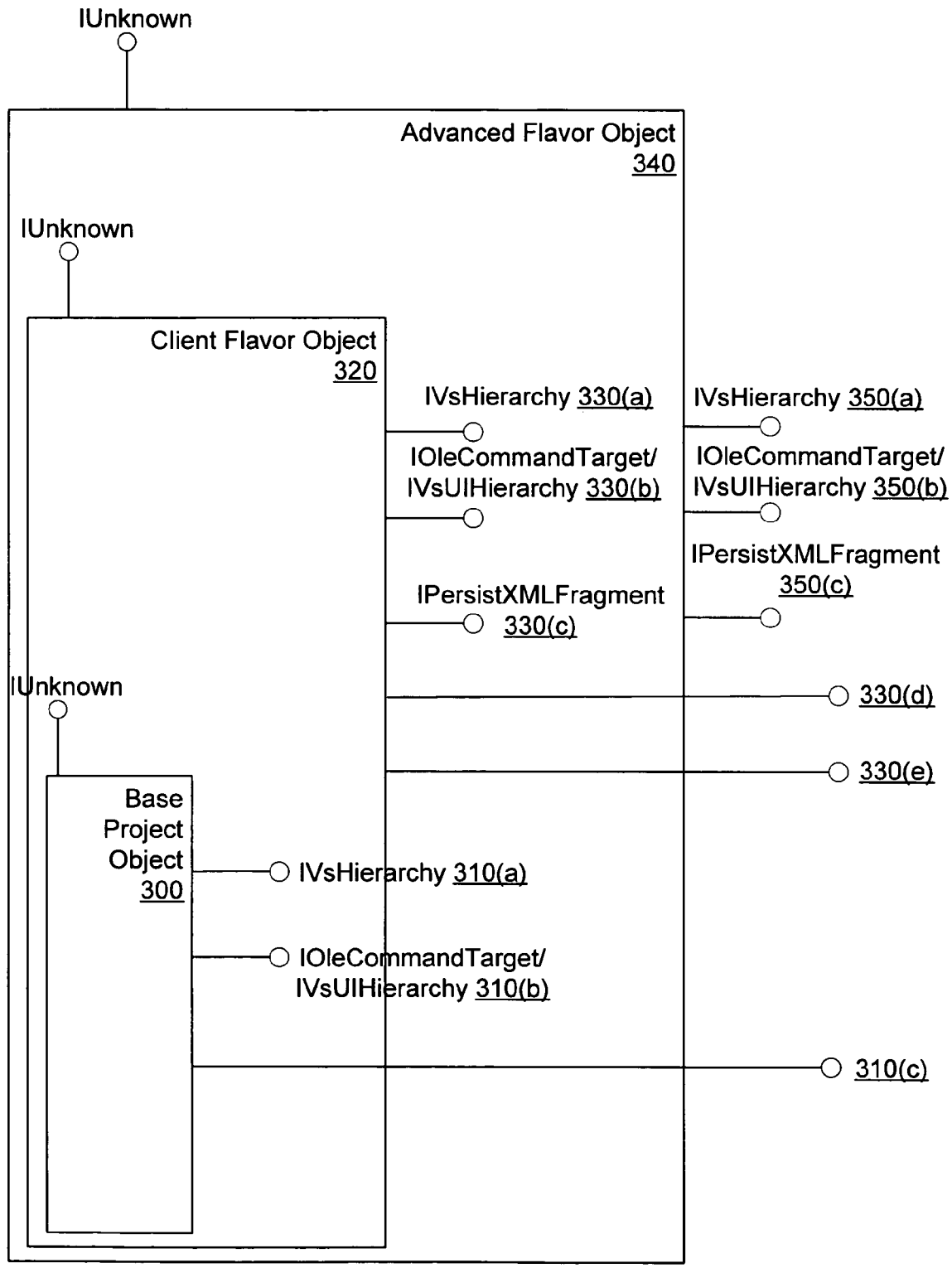
FIG. 3 is a block diagram of multiple flavors applied to a project system according to one embodiment of the invention.

In addition, multiple flavors can be applied, with a hierarchical ordering. FIG. 3 is a block diagram of multiple flavors applied to a project system according to one embodiment of the invention. As shown in FIG. 3, as in the previous figure, client flavor object 320 implements an IPersistXMLFragment 330(c). However, after the client flavor object has been COM aggregated with base project object 300, yielding a first aggregation, an advanced flavor object 340 has been applied by COM aggregating advanced flavor object with the result of that first aggregation. This yields a second aggregation, in which the advanced flavor object 340 also implements the IPersistXMLFragment as interface 350(c). Because of these aggregations, when the IPersistXMLFragment interface is needed by the client, the project system presents interface 350(c) as the IPersistXMLFragment interface which is available to the client. However, not all interfaces are replaced by the advanced flavor object 340. As shown in FIG. 3, interfaces 330(d) and 330(e) from the client flavor object 320, and interface 310(c) from the base project object 300 will be available to the client.

In a third COM aggregation, not shown, a policy object has also been applied. Generally, as many layers of aggregation as are required may be applied. The result of the multiple aggregations is the project system which will be used. The flavor being applied will be able to change a number of key project system features and functions. For example and without limitation, a project flavor may be able to do the following, some of which may be specific to VISUAL STUDIO IDEs, and others of which are generally applicable:

Change node properties, such as a caption and icon of a project node;
Completely override project BrowseObject (supplementing it is described below);
Control whether a project can be renamed;
Control SortPriority;
Control UserContext for dynamic help;
Control what contextual services are provided to designers/editors;
Participate in the command routing for project commands, including adding/removing/disabling commands;
Filter what the user sees on the toolbox for various designers;
Filter what the user sees in the AddNewItem dialog, or in the alternative, provide a new definition for the AddNewItem dialog;
Determine the default generator given a file extension; and
Map a human-readable generator name to a COM object.

Other Extensions to Base Project Object Functionality—Properties in Base Project Interface In addition to the changes to interfaces described above, the base project object 300 can use properties to enable the project flavor to control various features. In one embodiment, for example, the base project can provide a default value for properties such as a platform name to be used for configuration objects. In order to provide for modification of these properties, the properties to be modified are included in an interface in the base project. For example, these properties may be included in an interface IVsHierarchy 310(a) in the base project. These properties are obtained via query interface (QI) for the IVsHierachy interface. Because the IVsHierarchy interface 310(a) of the base project 300 is overridden by flavors applied, the flavors can alter the behavior of the project as set in such properties.

Other Extensions to Base Project Object Functionality—Extensibility through Delegation Another way to extend base project object functionality is through new APIs which are implemented in flavors and which provide for extensions of the functionality of the project system. In some project system, the project system object creates other objects (delegate objects) which are also used to provide user functionality. In one embodiment, the flavor can affect and enhance these objects as well.

Figure 4:
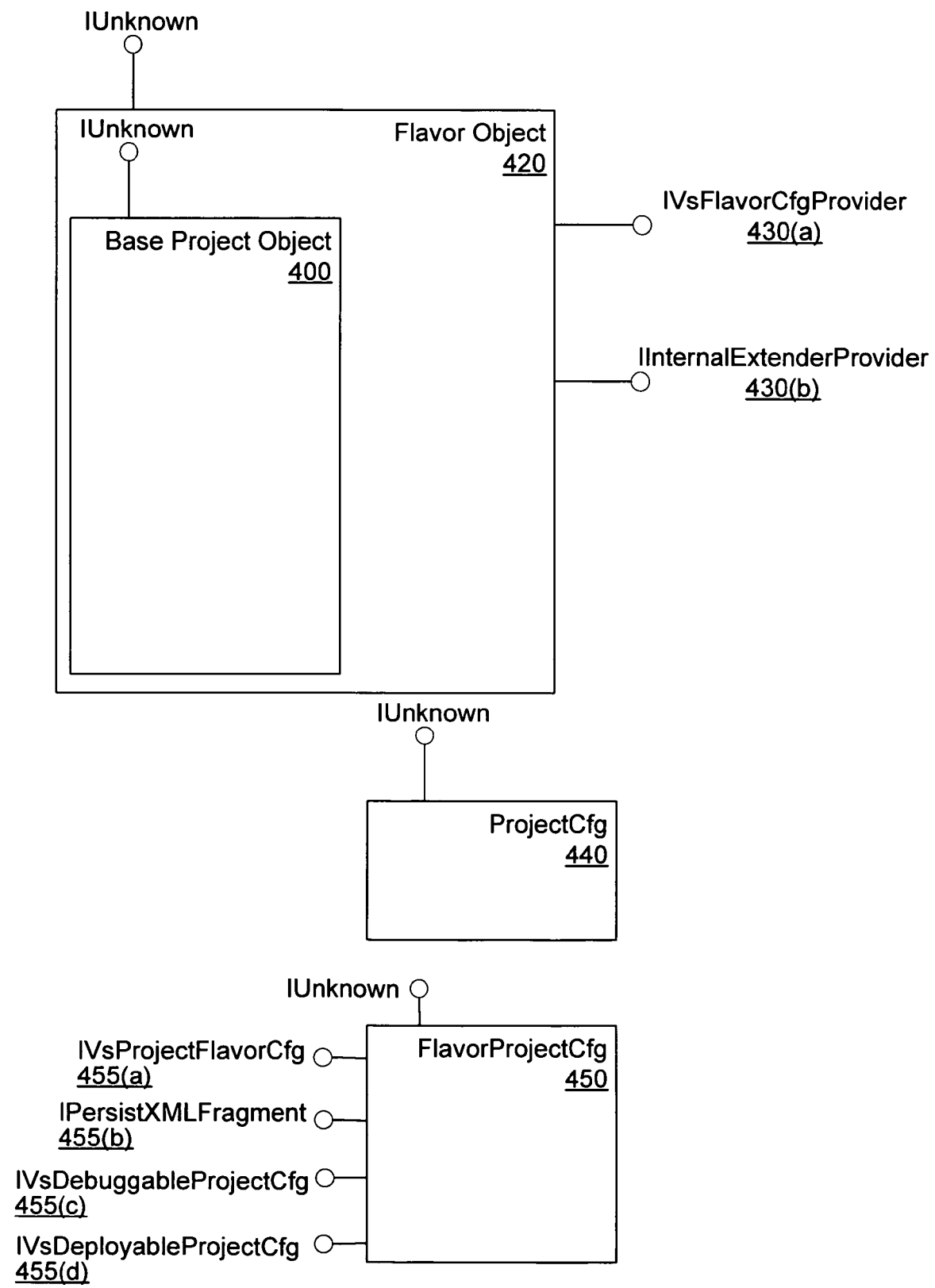
FIG. 4 is a block diagram of extensibility through an interface in a flavor according to one embodiment of the invention.

FIG. 4 is a block diagram of extensibility through an interface in a flavor according to one embodiment of the invention. As shown in FIG. 4, an IVsFlavorCfgProvider interface 430(a) is provided on a flavor object 420 which has been applied to a base project object 400. The base project 400 implements a delegate object, base project configuration object ProjectCfg object 440. Project configuration objects allow properties other than the certain properties (common properties) of the project to be made available. Project configuration objects add various configuration properties specific to one kind of build for one platform. Thus, these configuration-dependent properties are defined in each project configuration object. These project properties can be used to determine, for example, which project items will be included in a particular build, what output files will be created, where the output files will be put, and how they will be optimized.

In order to allow the flavor to also affect the properties which are defined in the project configuration object, the IVsFlavorCfgProvider interface 430(a) is used to provide a flavor-specific project configuration object FlavorProjectCfg object 450. The base project configuration object delegates to this FlavorProjectCfg object 450, allowing the flavor object 420 to extend the ProjectCfg object 440. The IVsFlavorCfgProvider interface 430(a) functions as a factory for project flavor's configuration objects. The base project system asks the project flavor to create an IVsFlavorCfg object 450 corresponding to each one of its configuration objects. The FlavorCfg object(s) 450 can implement an interface (IPersistXMLFragment interface 455(b)) which manages persistence into the project file.

As discussed above, FlavorProjectCfg object 450 enhances the base project configuration object. For example, as shown in FIG. 4, IVsProjectFlavorCfg interface 455(a) is an interface which can be called by the ProjectCfg object 440 in order to access these interfaces of FlavorProjectCfg object 450 that enhance the base project configuration object (e.g. IVsDebuggableProjectCfg, IVsDeployableProjectCfg, etc.). This IVsProjectFlavorCfg interface gives the FlavorProjectCfg object 450 flexibility in how it organizes it implementation. It can implement the project configuration enhancing interfaces on itself or on one or more different helper objects. FlavorProjectCfg object 450 includes interfaces including IPersistXMLFragment interface 455(b) which allows the project flavor to persist arbitrary structured data to the project file. IVsDebuggableProjectCfg interface 455(c) is an interface which allows flavor object 420 to control how the debugger is launched. IVsDeployableProjectCfg interface 455(d) is an interface which allows flavor object 420 to introduce the deploy phase of the project. Depending on the project system's needs and structure, other objects may exist which are similarly extended through delegation. A flavor delegation object may also include an extender interface which allows the use of functionality at an extender site. This allows the extension of existing objects, if those objects have been prepared with extensibility, with new properties and methods without changing the existing object. This allows flavors to provide extensible functionality to flavored objects.

Creation of a Flavored System

Figure 5:
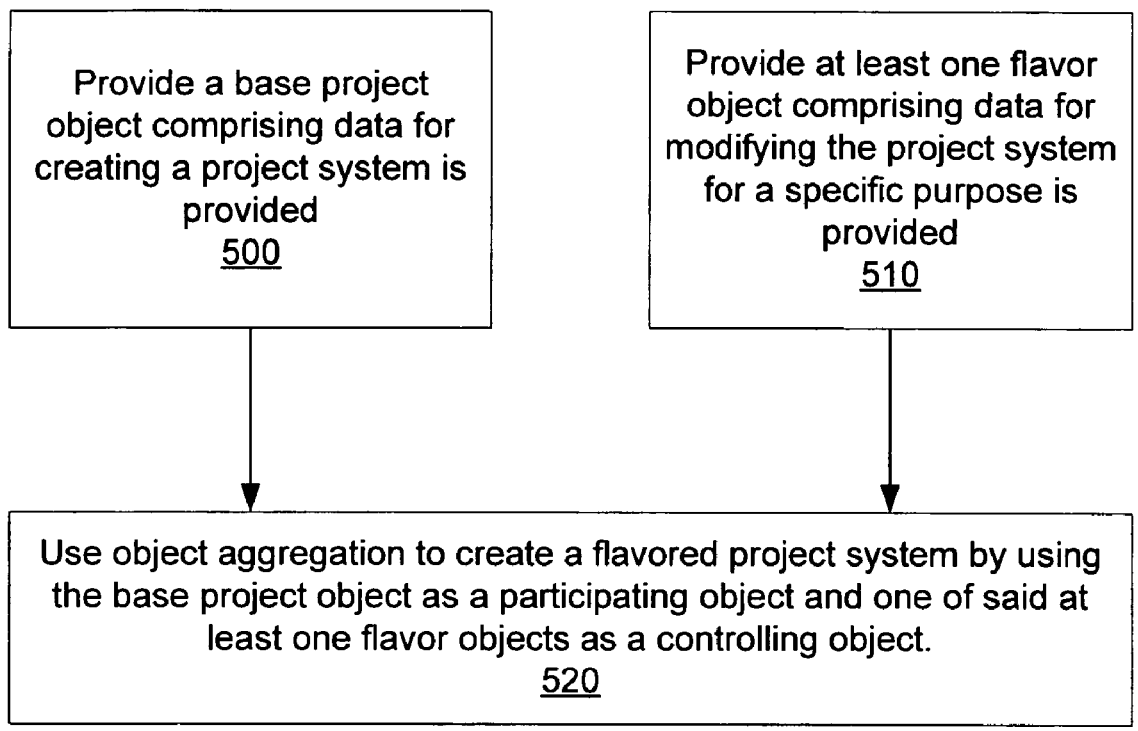
FIG. 5 is a flow diagram depicting a method for building extensible project systems according to one embodiment of the invention.

FIG. 5 is a flow diagram depicting a method for building extensible project systems according to one embodiment of the invention. As shown in FIG. 5, first, a base project object comprising data for creating a project system is provided, in step 500. In addition, at least one flavor object comprising data for modifying the project system for a specific purpose is provided, in step 510. In step 520, a flavored project system adapted for the specific purpose is created by using object aggregation using the base project object as a participating object and one of said at least one flavor objects as a controlling object.

Object aggregation using additional flavors may be used. For example, if Flavor A has purpose A, and Flavor B has purpose B, a project system adapted for both purposes A and B may be created by aggregating a flavor object for Flavor B as the controlling object with the project system as the participating object. The resulting object is then used as the participating object with the flavor object for Flavor A as the controlling object in a second aggregation. The order of the aggregation may be significant, for example, if both Flavor A and Flavor B change a value for a specific property, the Flavor A's change may override Flavor B's change if the aggregation proceeds as in the example above.

Initialization of a Flavored System

In one embodiment, in order to add one or more flavors to a project, the flavors to be added are identified inside of the project file. For example, a unique GUID corresponding to each flavor to be used in the project system may be stored inside of the project file. The project is then created as usual, however, when the GUIDs of project flavors are encountered, they are used to create the aggregated project.

For example, in VISUAL STUDIO, a ProjectFactory is used to create the project, and when CreateProject is called, the project GUID and extension will be located. However, when CreateProject is called and discovers that there are flavors to be aggregated, a new global service CreateAggregatedProject is called. The CreateAggregatedProject service constructs the appropriately aggregated project using the project GUID and the GUIDs of the flavors.

If a flavored system has already been created, the flavoring of the system may be changed. GUIDs are stored in the project file. A method on IVsAggregatableProject allows the list of project flavor GUIDs to be changed. The new project can then be saved, unloaded and reloaded, which results in a recreated project with the new set of flavors in effect.

CONCLUSION

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed is:

1. A method for building an extensible project system for software development by allowing a project flavor with ability to customize parts of a base project system to be applied to the base project system comprising:

providing a base project component object model (COM) object comprising data for creating an extensible project system, wherein the base project COM object implements a base project configuration COM object that includes configuration properties for the base project COM object, the configuration properties comprising an indication of a build of the extensible project system, the base project COM object implementing an API (application programming interface) called by the base project COM object to invoke configuration properties of the base project COM object;

providing a flavor COM object comprising data for modifying said base project system for a specific purpose, wherein the flavor COM object includes flavor-specific project configuration properties comprising a project flavor set, the flavor set comprising a caption of a project node, an icon of a project node, a property allowing a project browse object to be completely overridden, a control allowing a project to be renamed, a sort priority control, a property allowing a command to be added, a property allowing a command to be removed, a property allowing a command to be disabled, a filter, a property allowing a default generator given a file extension to be determined, and a property allowing a human-readable generator name to be mapped to a COM object, the flavor COM object implementing an API called by the base project COM object to invoke flavor-specific project configuration properties of the flavor COM object;

signaling, by the base project COM object, to the flavor COM object that the base project configuration COM object needs to be extended;

creating a flavored project system adapted for said specific purpose by COM-type aggregation with cooperation between COM objects using said base project COM object as a participating COM object and said flavor COM object as a controlling COM object, wherein the controlling COM object can replace or enhance interfaces of the participating COM object; and creating, by the flavor COM object, a flavored project configuration COM object by COM-type aggregation that determines which implementation of said APIs to be used and allows said flavor COM object to override said base project COM object, wherein at least one configuration property for the base project COM object is overridden by a corresponding flavor-specific project configuration property.

2. The method of claim 1, where said at least one flavor COM object comprises at least a first flavor COM object and a second flavor COM object, and where said step of creating a flavored project system comprises:
creating an intermediary COM object by aggregating said first flavor COM object as a controlling COM object and said base project COM object as a participating COM object; and
creating a flavored project system by using said second flavor COM object as a controlling COM object and said intermediary COM object as a participating COM object.

3. The method of claim 1 where said step of creating a flavored project system comprises allowing at least one interface of said base project to be modified by said flavor COM object.

4. The method of claim 3 where said step of creating a flavored project system comprises allowing a value for at least one property stored in said at least one interface of said base project to be modified by a value for said at least one property stored in an interface of said flavor COM object.

5. The method of claim 1 where said step of creating a flavored project system comprises allowing at least one interface of said base project to be replaced by said flavor COM object.

6. The method of claim 1, wherein said flavored base project configuration COM object includes an extender interface, said creation of a project system further comprising:
providing an extender site COM object associated with said extender interface.

7. A system for building an extensible project system for software development by allowing a project flavor with ability to customize parts of a base project system to be applied to the base project system, comprising:
a processor;
a process configured to instantiate a base project component object model (COM) object comprising data for creating an extensible project system, wherein the base project COM object implements a base project configuration COM object that includes configuration properties for the base project COM object, the configuration properties comprising a configuration set, the configuration set comprising an indication of a build of the extensible project system, an output file to be created, and an indication as to where the output file will be placed, the base project COM object implementing an API (application programming interface) called by the base project COM object to invoke configuration properties of the base project COM object;
a process configured to instantiate at least one flavor COM object comprising data for modifying said base project COM object for a specific purpose, wherein the at least one flavor COM object includes flavor-specific project configuration properties, the flavor COM object implementing an API that is called by the base project COM object to invoke flavor-specific project configuration properties of the flavor object;
a process in the base project COM object configured to signal the at least one flavor COM object that the base project configuration COM object needs to be extended;
a process configured to generate a flavored project system for said specific purpose by COM-type aggregation with cooperation between COM objects using said base project COM object as a participating COM object and one of said at least one flavor COM objects as a controlling COM object, wherein the controlling COM object can replace or enhance interfaces of the participating COM object; and
a process in the at least one flavor COM object configured to generate a flavored base project configuration COM object by COM-type aggregation that determines which implementation of said APIs to be used and allows said flavor COM object to override said base project COM object, wherein at least one configuration property for the base project COM object is modified by a corresponding flavor-specific project configuration property.

8. The system of claim 7, where said at least one flavor COM object comprises at least a first flavor COM object and a second flavor COM object, and where said aggregator further comprises:
a first aggregator for creating an intermediary COM object by aggregating said first flavor COM object as a controlling COM object and said base project COM object as a participating COM object; and
a second aggregator for creating a flavored project system by using said second flavor COM object as a controlling COM object and said intermediary COM object as a participating COM object.

9. The system of claim 7 where said aggregator causes at least one interface of said base project to be modified by said flavor COM object.

10. The system of claim 9 where said aggregator causes a value for at least one property stored in said at least one interface of said base project to be modified by a value for said at least one property stored in an interface of said flavor COM object.

11. The system of claim 7 where said aggregator causes at least one interface of said base project to be replaced by said flavor COM object.

12. The system of claim 7, wherein said flavored base project configuration COM object includes an extender interface, said project system further comprising:
an extender site COM object associated with said extender interface.

13. A computer-readable storage medium for building an extensible project system for software development by allowing a project flavor with ability to customize parts of a base project system to be applied to the base project system, said computer readable storage medium storing instructions for causing a computer to perform the steps of comprising:
providing a base project component object model (COM) object comprising data for creating an extensible project system, wherein the base project COM object implements a base project configuration COM object that includes configuration properties for the base project COM object, the configuration properties comprising a configuration set, the configuration set comprising an indication of a build of the extensible project system, an output file to be created, and an indication as to where the output file will be placed, the base project COM object implementing an API (application programming interface) called by the base project COM object to invoke configuration properties of the base project COM object;
providing at least one flavor COM object comprising data for modifying said project COM object for a specific purpose, wherein the at least one flavor COM object includes flavor-specific project configuration properties, the flavor COM object implementing an API that is called by the base project COM object to invoke flavor-specific project configuration properties of the flavor object;

signaling by the base project COM object to the at least one flavor COM object that the base project configuration COM object needs to be extended;

creating a flavored software development project system for said specific purpose by COM-type object aggregation with cooperation between COM objects using said base project COM object as a participating COM object and one of said at least one flavor COM objects as a controlling COM object, wherein the controlling COM object can replace or enhance interfaces of the participating COM object; and creating, by the at least one flavor COM object, a flavored project configuration COM object by COM-type aggregation that determines which implementation of said APIs to be used and allows said flavor COM object to override said base project COM object, wherein at least one configuration property for the base project COM object is modified by a corresponding flavor-specific project configuration property.

14. The computer-readable storage medium of claim 13, where said at least one flavor COM object comprises at least a first flavor COM object and a second flavor COM object, and where said step of creating a flavored project system comprises:

creating an intermediary COM object by aggregating said first flavor COM object as a controlling COM object and said base project COM object as a participating COM object; and creating a flavored project system by using said second flavor COM object as a controlling COM object and said intermediary COM object as a participating COM object.

15. The computer-readable storage medium of claim 13 where said step of creating a flavored project system comprises allowing at least one interface of said base project to be modified by said flavor COM object.

16. The computer-readable storage medium of claim 15 where said step of creating a flavored project system comprises allowing a value for at least one property stored in said at least one interface of said base project to be modified by a value for said at least one property stored in an interface of said flavor COM object.

17. The computer-readable storage medium of claim 13 where said step of creating a flavored project system comprises allowing at least one interface of said base project to be replaced by said flavor COM object.

18. The computer-readable storage medium of claim 13, wherein said flavored base project configuration COM object includes an extender interface, said creation of a project system further comprising:

providing an extender site COM object associated with said extender interface.

* * * * *